(12) United States Patent
Suzuki

(10) Patent No.: US 11,953,055 B2
(45) Date of Patent: Apr. 9, 2024

(54) INSPECTING METHOD AND INSPECTING DEVICE OF RACEWAY RING MEMBER

(71) Applicant: NSK Ltd., Tokyo (JP)

(72) Inventor: Hidekazu Suzuki, Fujisawa (JP)

(73) Assignee: NSK LTD., Tokyo (JP)

( * ) Notice: Subject to any disclaimer, the term of this patent is extended or adjusted under 35 U.S.C. 154(b) by 383 days.

(21) Appl. No.: 17/416,809

(22) PCT Filed: Dec. 2, 2019

(86) PCT No.: PCT/JP2019/046968
§ 371 (c)(1),
(2) Date: Jun. 21, 2021

(87) PCT Pub. No.: WO2020/158163
PCT Pub. Date: Aug. 6, 2020

(65) Prior Publication Data
US 2022/0082128 A1 Mar. 17, 2022

(30) Foreign Application Priority Data
Jan. 31, 2019 (JP) .................................. 2019-015851

(51) Int. Cl.
*F16C 19/52* (2006.01)
*F16C 33/78* (2006.01)
*G01M 13/04* (2019.01)

(52) U.S. Cl.
CPC .......... *F16C 19/52* (2013.01); *F16C 33/7883* (2013.01); *G01M 13/04* (2013.01); *F16C 2240/54* (2013.01)

(58) Field of Classification Search
CPC .. F16C 19/52; F16C 2240/54; F16C 33/7883; F16C 33/76; F16C 33/00; F26C 33/7806; G01M 13/04
(Continued)

(56) References Cited

U.S. PATENT DOCUMENTS

2012/0230579 A1 9/2012 Oikawa et al.
2013/0155397 A1* 6/2013 Kumagai ............. G01D 5/2457
356/138

FOREIGN PATENT DOCUMENTS

CN 1408596 A * 4/2003
CN 202092970 U 12/2011
(Continued)

OTHER PUBLICATIONS

Office Action dated Feb. 12, 2023 from the China National Intellectual Property Administration in CN Application No. 201980089706.0.
(Continued)

*Primary Examiner* — Hoa Q Pham
(74) *Attorney, Agent, or Firm* — Sughrue Mion, PLLC

(57) ABSTRACT

A photographing step of obtaining an original image by photographing a part or all of a sliding surface using a camera is performed and then an imaging process of detecting machining marks on the original image is performed; a detecting step of obtaining a detection image is performed; and an evaluating step of estimating a difference of a rotation torque of the raceway ring member with respect to another raceway ring member on the basis of the detection image in a direction of relative rotation between the raceway ring member and the other raceway ring member when a rolling bearing is constituted by combining a raceway ring member with the other raceway ring member is performed.

9 Claims, 10 Drawing Sheets

(58) Field of Classification Search
USPC .......................................................... 356/138
See application file for complete search history.

(56) References Cited

FOREIGN PATENT DOCUMENTS

| | | | |
|---|---|---|---|
| CN | 106062392 A | | 10/2016 |
| CN | 107703154 A | | 2/2018 |
| CN | 107727665 A | | 2/2018 |
| CN | 208075769 U | * | 11/2018 |
| DE | 10 2015 206 613 A1 | | 10/2016 |
| JP | 07-091452 A | | 4/1995 |
| JP | 2001-138186 A | | 5/2001 |
| JP | 2008-274994 A | | 11/2008 |
| JP | 2011-031370 A | | 2/2011 |
| JP | 2017-203467 A | | 11/2017 |
| JP | 2018-066405 A | | 4/2018 |
| WO | 2011/061887 A1 | | 5/2011 |

OTHER PUBLICATIONS

Extended European Search Report dated Oct. 29, 2021, issued by the European Patent Office in application No. 19913770.4.
International Search Report for PCT/JP2019/046968 dated Jan. 28, 2020 (PCT/ISA/210).

* cited by examiner

200

US 11,953,055 B2

INSPECTING METHOD AND INSPECTING DEVICE OF RACEWAY RING MEMBER

TECHNICAL FIELD

The present invention relates to an inspecting method and an inspecting device of a raceway ring member such as an inner ring and an outer ring constituting a rolling bearing and a hub constituting a hub unit bearing.

This application is a National Stage of International Application No. PCT/JP2019/046968 filed Dec. 2, 2019, claiming priority based on Japanese Patent Application No. 2019-015851, filed Jan. 31, 2019, the content of which is incorporated herein by reference.

BACKGROUND ART

Rolling bearings such as ball bearings, roller bearings, and tapered roller bearings are assembled in rotation supporting portions of various types of mechanical devices. A rolling bearing includes an outer ring having an outer ring raceway in an inner circumferential surface, an inner ring having an inner ring raceway in an outer circumferential surface, and a plurality of rolling elements disposed to freely roll between the outer ring raceway and the inner ring raceway. Furthermore, a rolling bearing includes sealing devices so that grease sealed into the internal space having the rolling elements installed therein is prevented from leaking outside and foreign substances such as rainwater, mud, and dust are prevented from entering the internal space. The sealing devices have at least one seal lip whose distal end portion comes into sliding contact with a sliding surface formed on the inner ring over the entire circumference.

When the outer ring and the inner ring are relatively rotated, in order to minimize a sliding torque of a distal end portion of the seal lip with respect to the sliding surface, a portion of the inner ring including at least the sliding surface may be subjected to grinding using a grindstone. As a method for subjecting a portion of the inner ring including at least the sliding surface to grinding, for example, a centerless grinding method described in Japanese Unexamined Patent Application, First Publication No. 2001-138186 can be adopted. That is to say, when a rotating grindstone is pressed against an outer circumferential surface of the inner ring from a side substantially opposite to the adjustment wheel in a radial direction while the inner ring is rotating by pressing a rotating adjustment wheel against the outer circumferential surface of the inner ring in a state in which the inner ring is supported by a work rest from below, the outer circumferential surface of the inner ring is subjected to grinding.

CITATION LIST

Patent Document

[Patent Document 1]
Japanese Patent Application, Publication No. 2001-138186

SUMMARY OF INVENTION

Technical Problem

When the outer circumferential surface of the inner ring is subjected to grinding using a grindstone, abrasive grains in the grindstone come into contact with the outer circumferential surface of the inner ring along with relative rotation of the grindstone with respect to the inner ring. Movement in a circumferential direction is performed while the abrasive grains are pressed against the outer circumferential surface of the inner ring along with the relative rotation of the grindstone with respect to the inner ring. Thus, metal present in the outer circumferential surface of the inner ring is removed using the abrasive grains. After that, the abrasive grains are separated from the outer circumferential surface of the inner ring along with relative rotation of the grindstone with respect to the inner ring. Therefore, if the outer circumferential surface of the inner ring is subjected to grinding by pressing a rotating grindstone having a certain degree of hardness against the outer circumferential surface of the inner ring while the inner ring is relatively rotated with respect to the grindstone in a predetermined direction, deformations such as bumps and burrs occur on both sides of a portion through which the abrasive grains pass. Such deformations have an inclination (directivity) in the circumferential direction. For this reason, if a portion in which deformations are present is a sliding surface with which a distal end portion of the seal lip comes into sliding contact, a problem in which a difference in a sliding torque of the distal end portion of the seal lip with respect to the sliding surface between a first relative rotation direction and a second relative rotation direction of the outer ring and the inner ring, that is, a difference in a rotation torque of the inner ring with respect to the outer ring (a difference in a rotation torque between forward rotation and reverse rotation) greatly differs is likely to occur. To be specific, if it is assumed that the outer ring is fixed, a sliding torque of the distal end portion of the seal lip with respect to the sliding surface is likely to differ (a difference is likely to occur in a sliding torque) between a case in which the inner ring is rotated in a predetermined direction (first relative rotation) and a case in which the inner ring is rotated in a direction opposite to the predetermined direction (second relative rotation). It is conceivable that one possible reason for this is that the sliding torque of the distal end portion of the seal lip with respect to the sliding surface differs depending on whether a sliding direction of the distal end portion of the seal lip with respect to the sliding surface is the same as a moving direction of the grindstone with respect to the inner ring when the inner ring is ground using the grindstone.

It is conceivable that, as a means for solving such a problem, a large number of machining marks in irregular directions be formed on the sliding surface by polishing a sliding surface having a grinding streak formed thereon using a brush with abrasive grains, a nonwoven fabric abrasive, or the like. That is to say, when a large number of machining marks in irregular directions are formed on the sliding surface, the surface unevenness of the sliding surface becomes complicated and thus it is possible to eliminate the directivity of the roughness in which the sliding surface is present. As a result, it is possible to reduce a difference in a rotation torque of the inner ring with respect to the outer ring in a direction of relative rotation between the outer ring and the inner ring.

The inner ring has a large number of machining marks formed thereon in irregular directions on the sliding surface and then is sent to an assembling step. In addition, the inner ring constitutes a rolling bearing in combination with the outer ring, the rolling elements, and the sealing device. Here, when a difference in the rotation torque of the inner ring with respect to the outer ring in the direction of relative rotation between the outer ring and the inner ring is not equal to or less than a predetermined value after the rolling bearing is assembled, it is necessary to disassemble the rolling bearing and polish the sliding surface again using a brush with abrasive grains, a nonwoven fabric abrasive, or the like, which is troublesome. Thus, before the rolling bearing is assembled, it is desired to realize an inspecting method capable of estimating the difference in the rotation torque of the inner ring with respect to the outer ring in the direction of relative rotation between the outer ring and the inner ring.

An object of the present invention is to realize an inspecting method for a raceway ring member in which rotation characteristics of a rolling bearing and a hub unit bearing and the like are able to be estimated before assembling is performed.

An aspect of an inspecting method of a raceway ring member of the present invention is to provide a raceway ring member having a sliding surface with which a distal end portion of a seal lip comes into sliding contact over the entire circumference and having a large number of machining marks formed on the sliding surface in irregular directions. To be specific, an inspecting method of the raceway ring member of the present invention is for application to an inner ring and an outer ring constituting a rolling bearing and a raceway ring member such as a hub constituting a hub unit bearing.

An aspect of the present invention is an inspecting method of a raceway ring member which includes a sliding surface with which a distal end portion of a seal lip is in sliding contact, the inspecting method including: obtaining an original image by photographing at least a part of the sliding surface using a camera; performing an imaging process on the original image and detecting a plurality of machining marks on the sliding surface; and estimating rotation characteristics of a component having the raceway ring member assembled therein on the basis of the detection results of the machining marks.

An aspect of an inspecting method for a raceway ring member of the present invention includes: performing a photographing step of obtaining an original image by photographing a part or all of a sliding surface using a camera and then performing a detecting step of subjecting the original image to imaging process of detecting machining marks to obtain a detection image; and performing an evaluating step of estimating, on the basis of the detection image, a difference in the rotation torque of the raceway ring member with respect to another raceway ring member in the direction of relative rotation between the raceway ring member and the other raceway ring member when the raceway ring member is combined with the other raceway ring member via a plurality of rolling elements and the distal end portion of the seal lip in which a base end portion is supported and fixed to the other raceway ring member comes into sliding contact with the sliding surface.

In the image step, it is possible to detect only the machining marks in a predetermined inclination angle range with respect to a grinding streak present on the sliding surface. To be specific, for example, the predetermined angle range can be set to 15 degrees or more and 45 degrees or less.

In the image step, it is possible to detect a portion in which a predetermined number or more of pixels which have a predetermined color are gathered and are present as the machining marks.

In the evaluating step, it is possible to estimate a difference of a rotation torque of the raceway ring member with respect to the other raceway ring member in a direction of relative rotation between the raceway ring member and another raceway ring member when the raceway ring member is combined with the other raceway ring member on the basis of an area and/or the number of machining marks in the detection image.

It is desirable that a lens of the camera be a telecentric lens.

It is desirable that a blue light source be used when the camera photographs the sliding surface.

An aspect of the present invention is a method for producing a rolling bearing including: inspecting a plurality of raceway ring members using the inspecting method according to any one of the above inspecting methods; and assembling a rolling bearing using the inspected raceway ring members.

An aspect of the present invention is a method for producing a hub unit bearing including: inspecting a plurality of raceway ring members using the inspecting method according to any one of the above inspecting methods; and assembling a hub unit bearing using the inspected raceway ring members.

An aspect of the present invention is a method for producing a vehicle including: producing the vehicle using the hub unit bearing produced through the production method.

An aspect of the present invention is an inspecting device of a raceway ring member including: a camera; and a controller, wherein the controller is configured to perform: obtaining an original image by photographing at least a part of a sliding surface with which a distal end portion of a seal lip in the raceway ring member is in sliding contact using the camera; performing an imaging process on the original image and detecting a plurality of machining marks on the sliding surface; and estimating rotation characteristics of a component having the raceway ring member assembled therein on the basis of the detection result of the machining marks.

Advantageous Effects of Invention

According to the above aspect of the present invention, before a rolling bearing, a hub unit bearing, and the like are assembled, it is possible to estimate a difference or the like of a rotation torque of one raceway ring member with respect to the other raceway ring member and rotation characteristics of a rolling bearing, a hub unit bearing, and the like in a direction of relative rotation between the pair of raceway ring members.

Figure 5A:
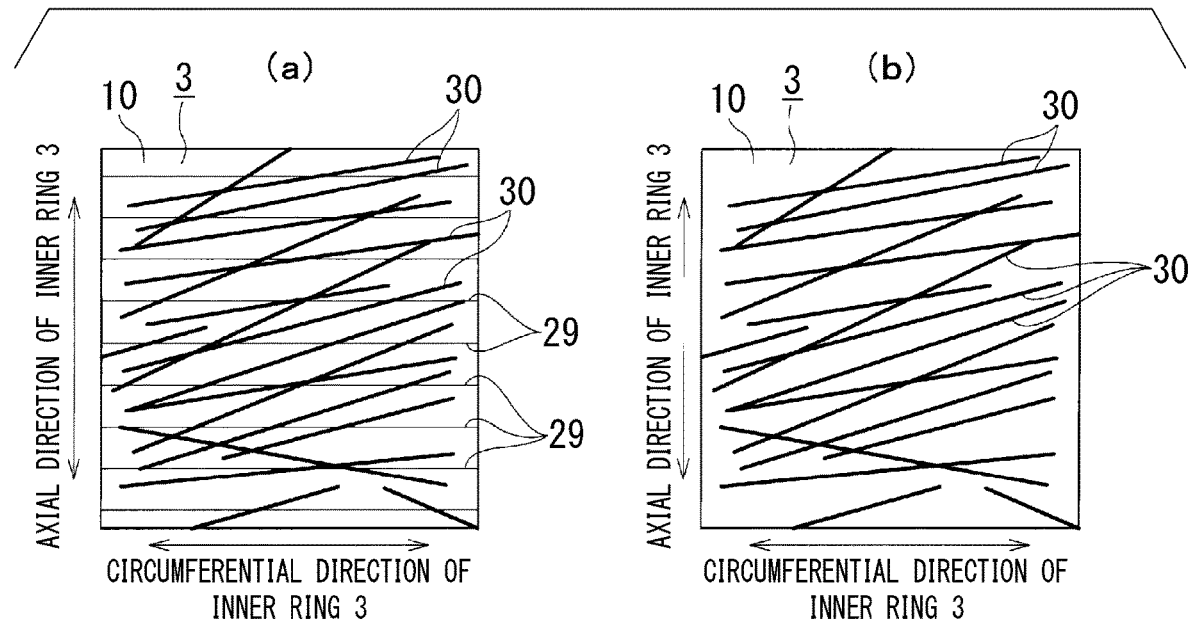

Part (a) of FIG. 5A is a diagram schematically showing an original image obtained by photographing a sliding surface on which machining marks are sufficiently formed and part (b) is a diagram schematically showing a detection image obtained by subjecting the original image shown in part (a) to an imaging process.

Figure 5B:
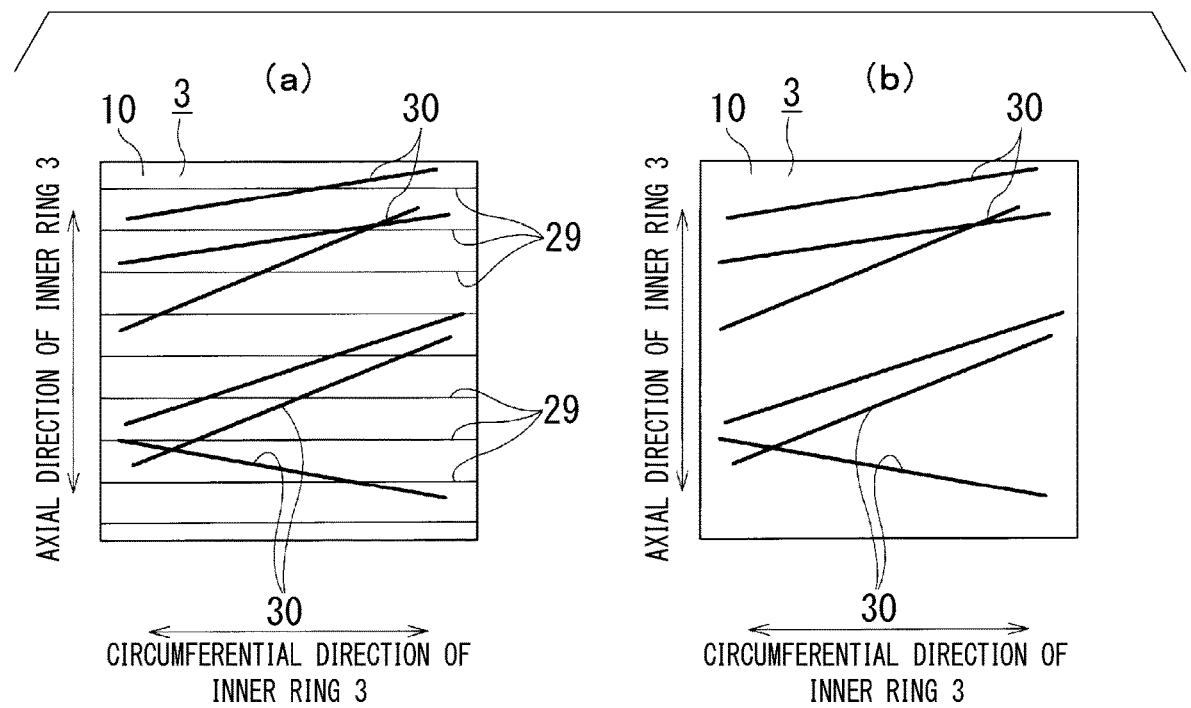

Part (a) of FIG. 5B is a diagram schematically showing an original image obtained by photographing a sliding surface having a small number of formed machining marks and part (b) is a diagram schematically showing a detection image obtained by subjecting the original image shown in part (a) to imaging process.

Figure 6:
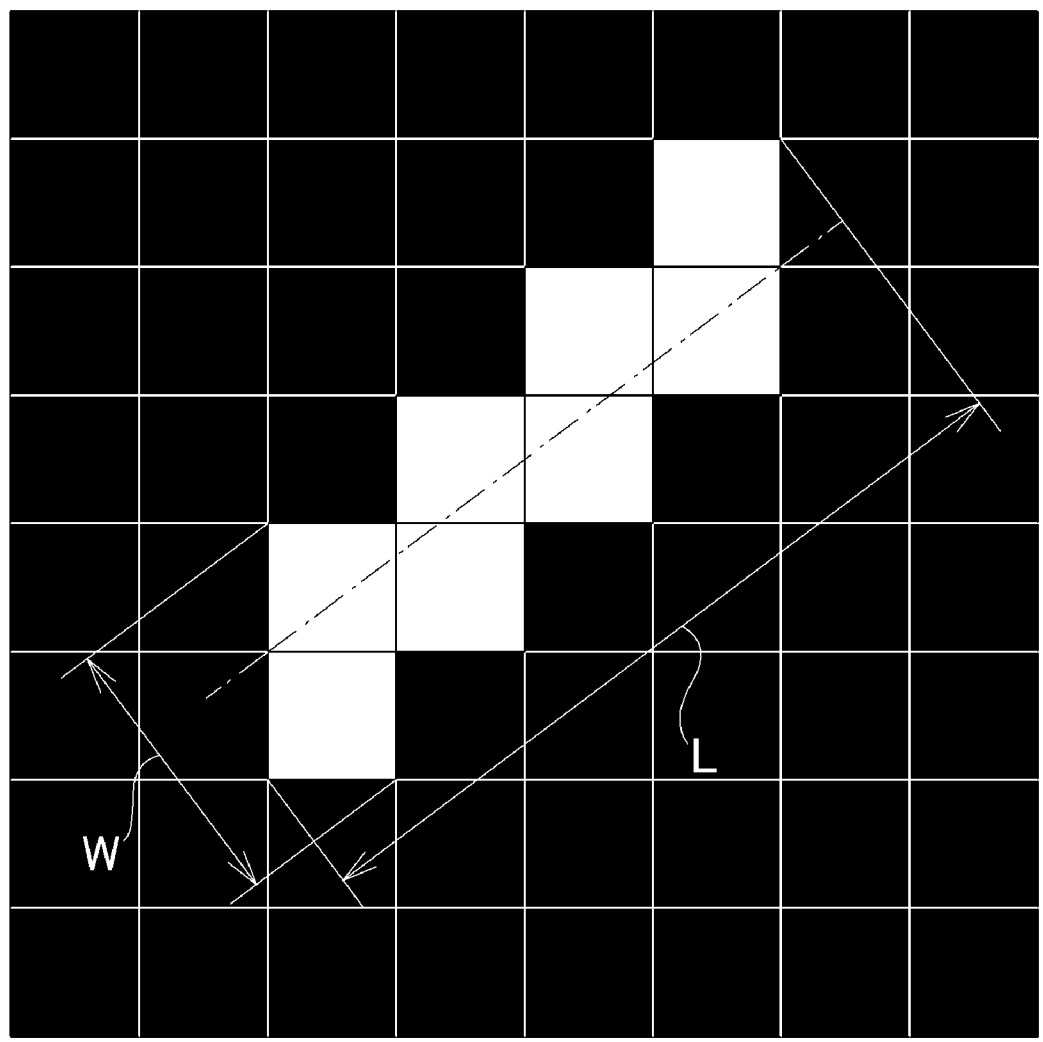

FIG. 6 is a schematic diagram for explaining a method for detecting a machining mark.

Figure 7:
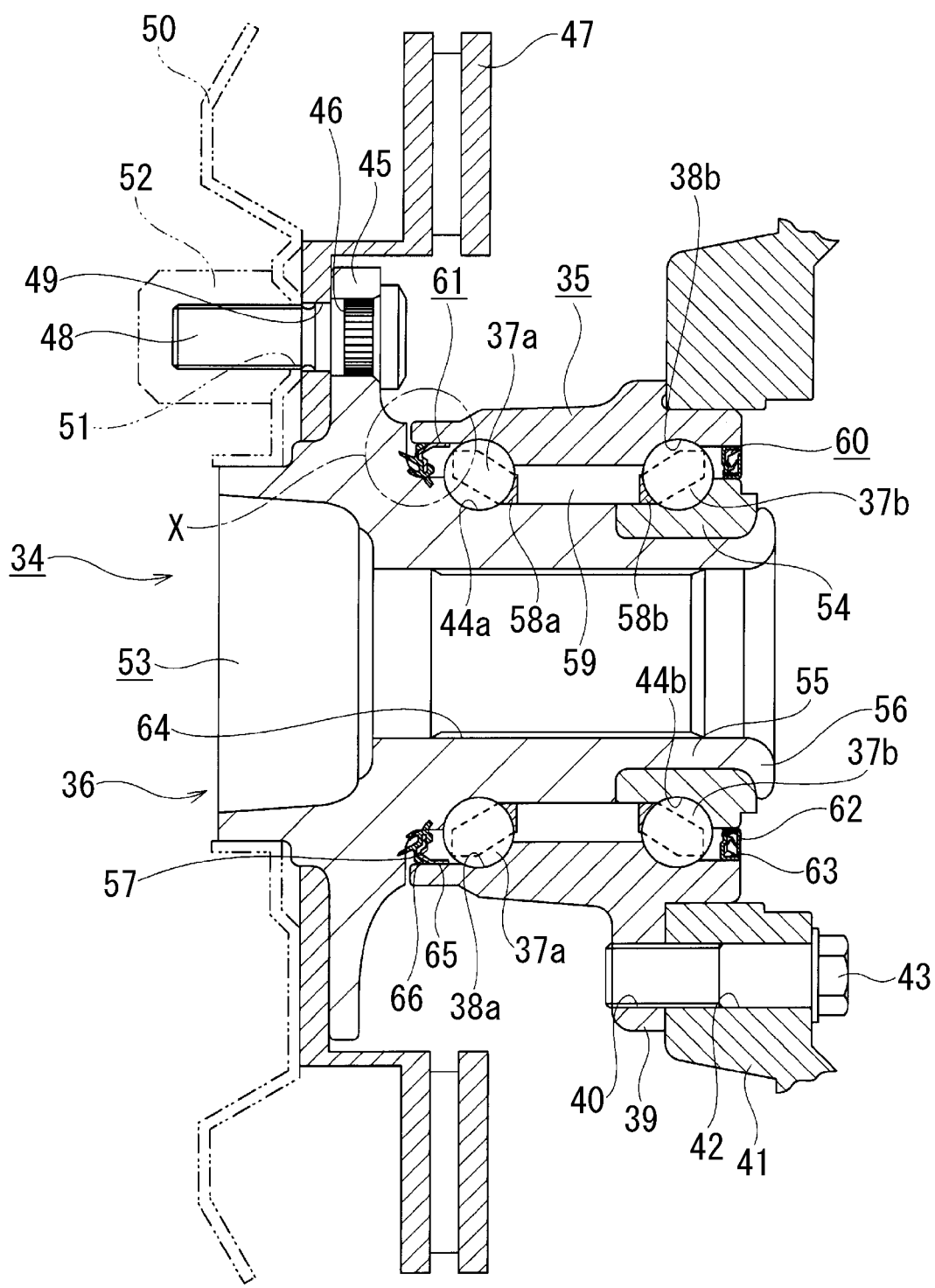

FIG. 7 is a cross-sectional view showing a hub unit bearing which is a target of a second example of the embodiment of the present invention.

Figure 8:
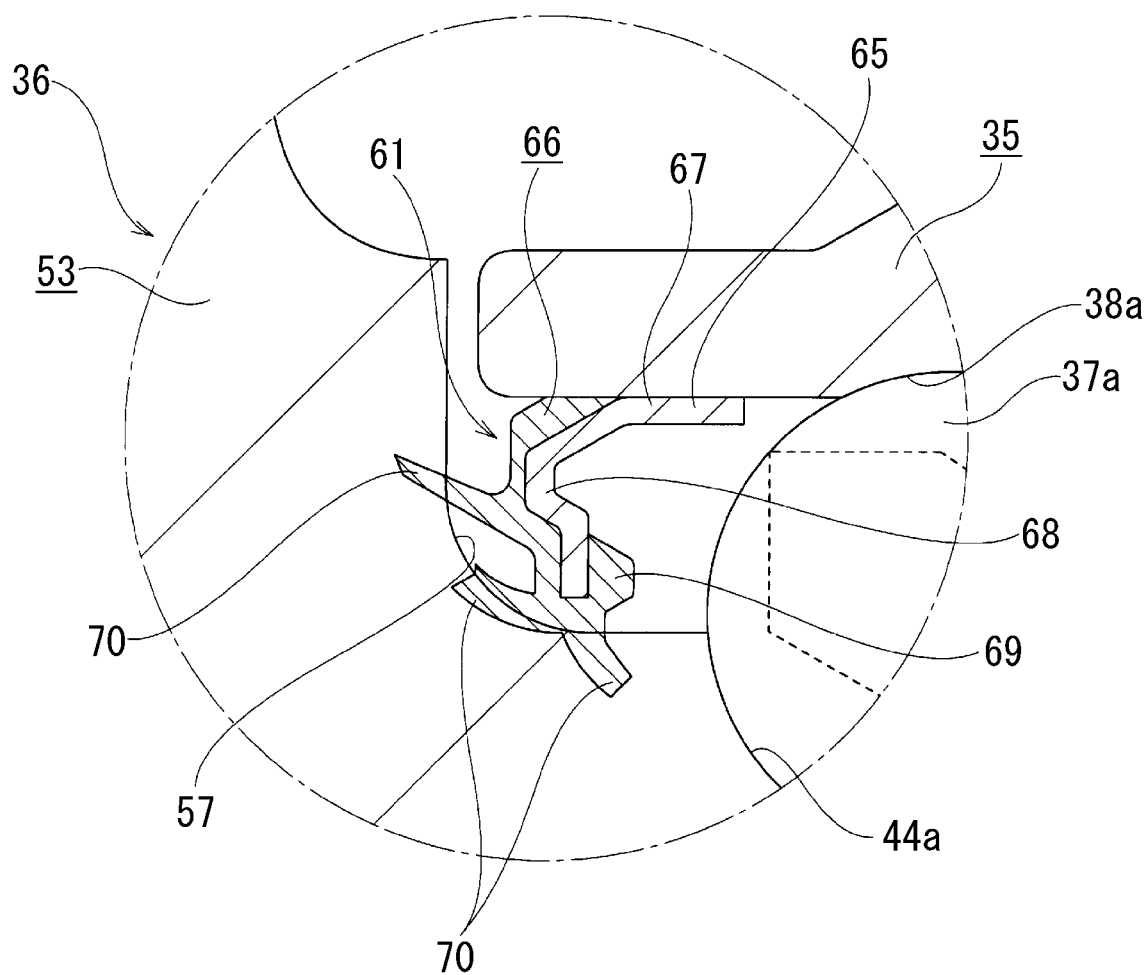

FIG. 8 is an enlarged view of a part X in FIG. 7.

Figure 9:
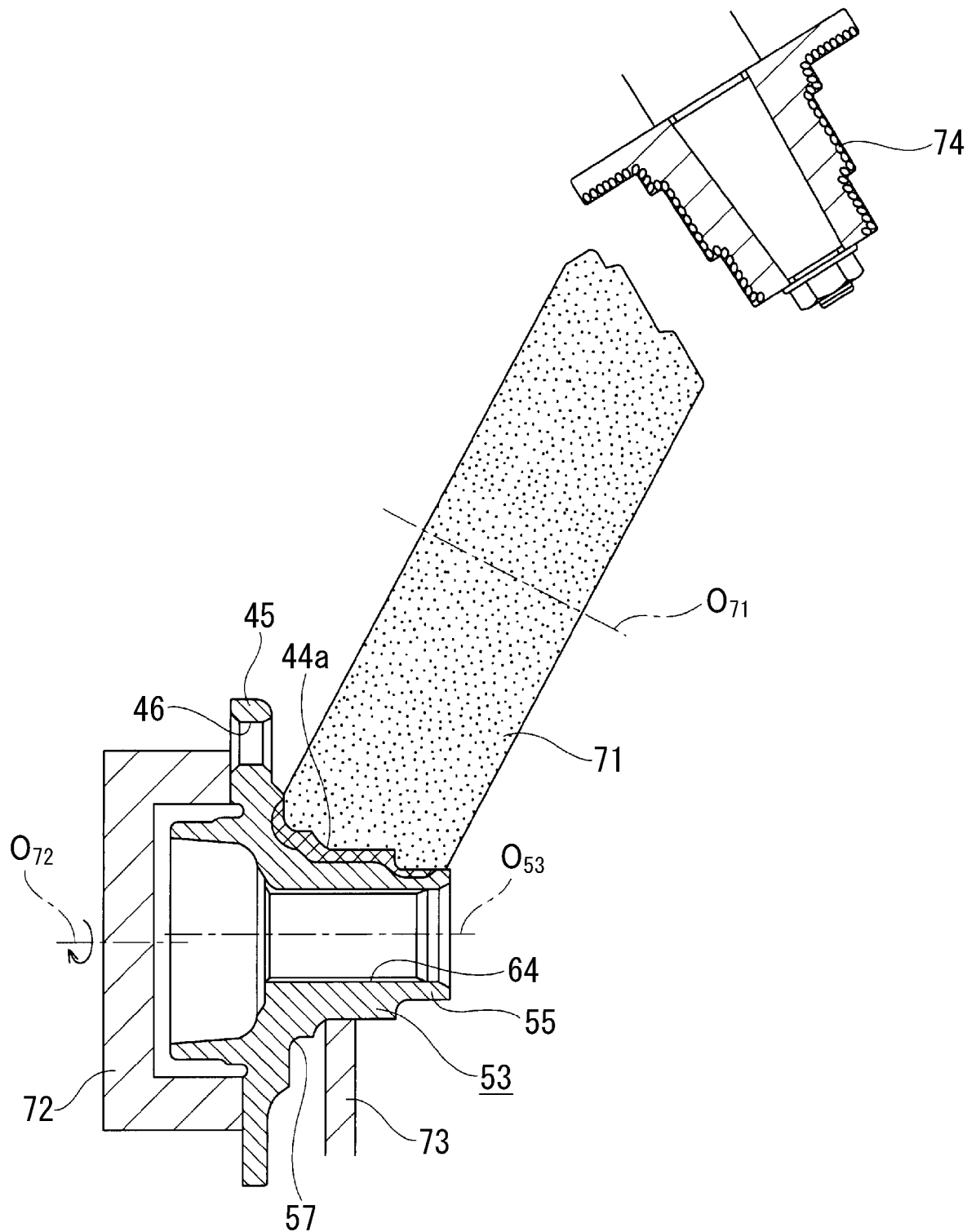

FIG. 9 is a cross-sectional view showing a state in which a centerless grinding step is performed in the second example of the embodiment of the present invention.

Figure 10:
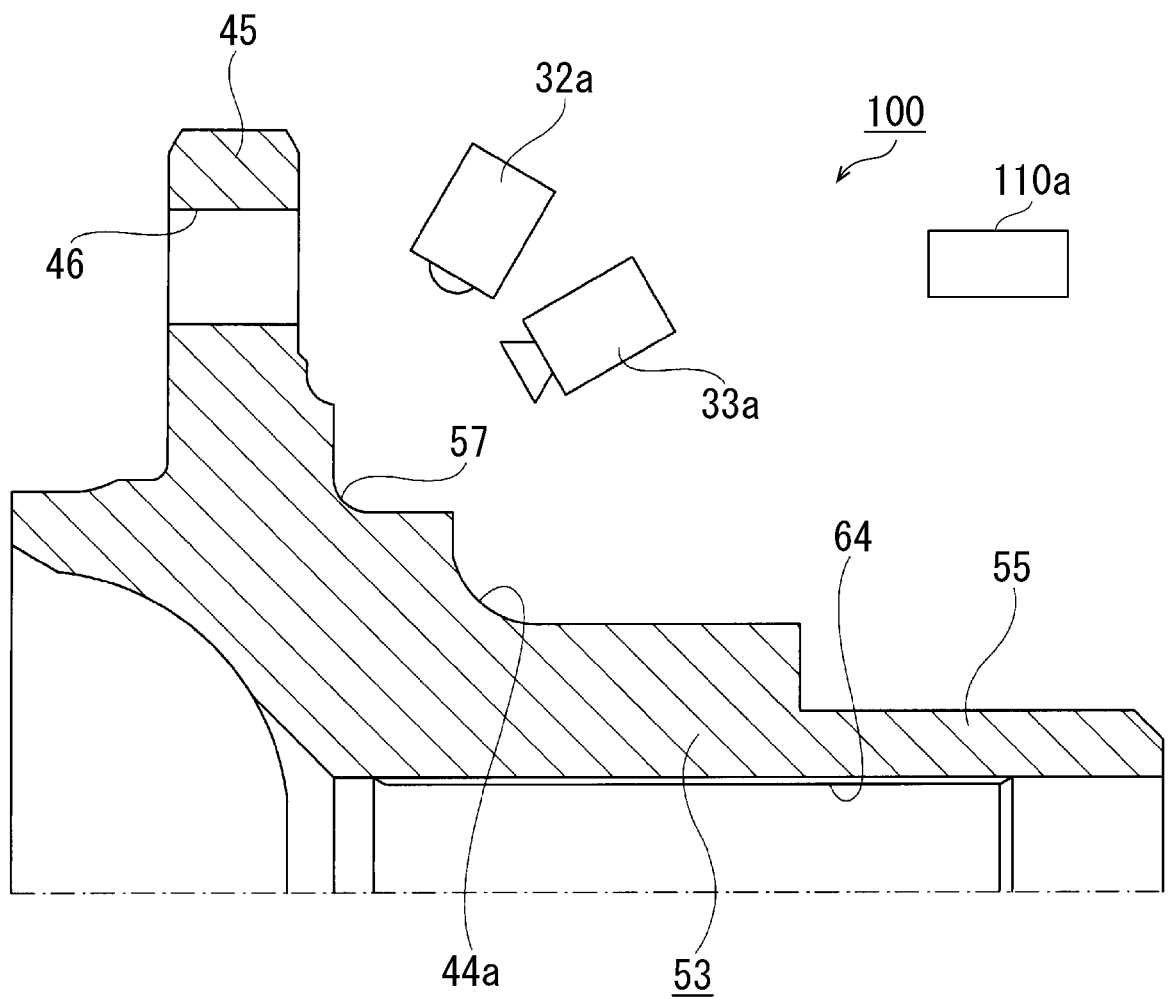

FIG. 10 is a schematic diagram showing a state in which a sliding surface is photographed using a camera in the second example of the embodiment of the present invention.

Figure 11:
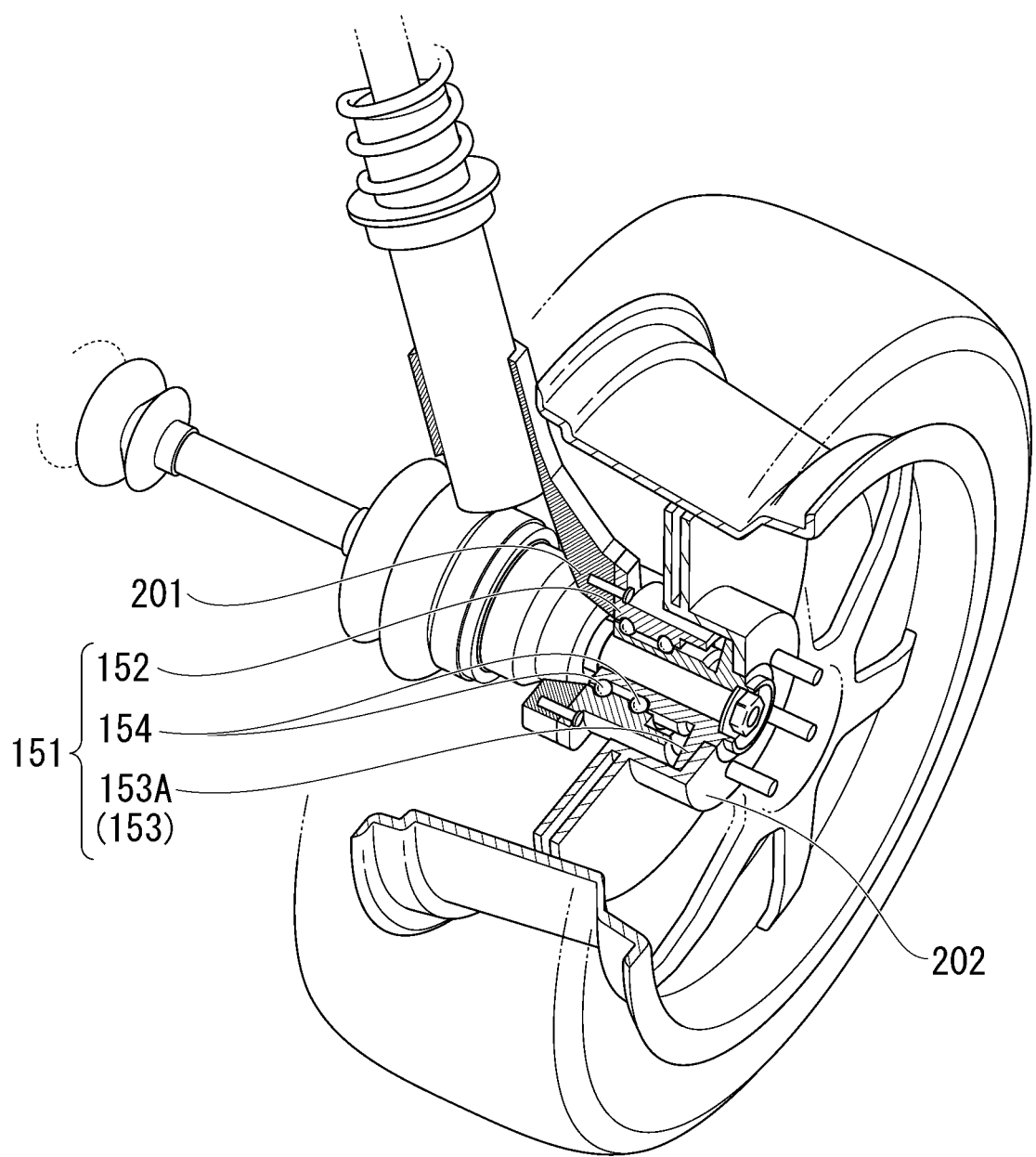

FIG. 11 is partial schematic diagram of a vehicle including a hub unit bearing (a bearing unit).

DESCRIPTION OF EMBODIMENTS

First Example of Embodiment

Figure 1:
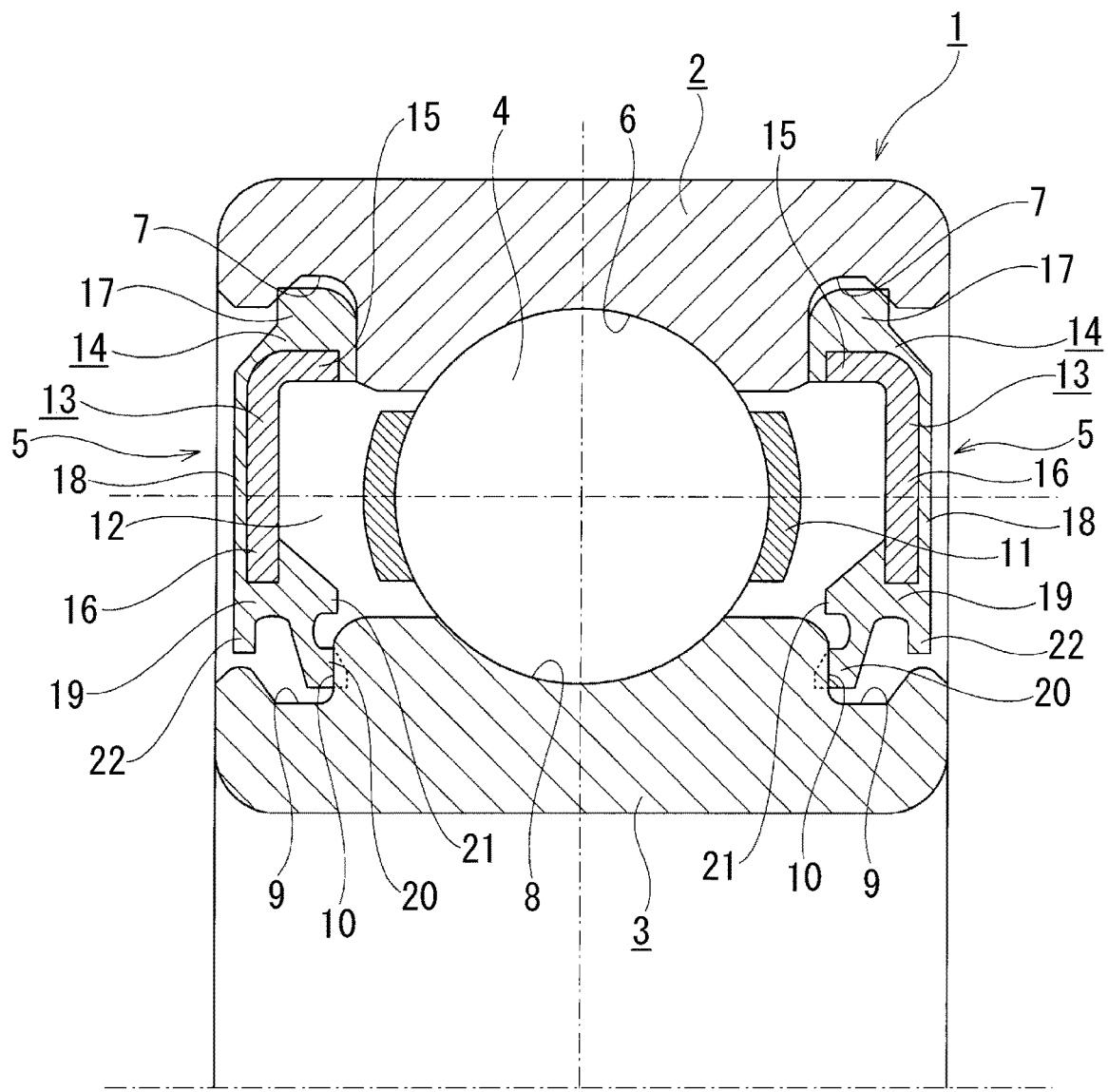
FIG. 1 is a cross-sectional view showing a rolling bearing which is a target of a first example of an embodiment of the present invention.

A first example of an embodiment of the present invention will be described with reference to FIGS. 1 to 6. FIG. 1 shows a rolling bearing 1 including an inner ring 3 which is a target of this example. The rolling bearing 1 includes an outer ring 2 which is a first raceway ring member, the inner ring 3 which is a second raceway ring member, a plurality of rolling elements 4, and a pair of sealing devices (seal rings) 5.

The outer ring 2 is made of a hard iron-based alloy such as bearing steel or carbonized steel, has an outer ring raceway 6 having an arc-shaped cross section in an inner circumferential surface in an axially central portion over the entire circumference, and has locking concave grooves 7 which are concave outward in a radial direction on inner circumferential surfaces of axial both side portions over the entire circumference.

The inner ring 3 is made of a hard iron-based alloy such as bearing steel or carbonized steel and disposed coaxially with the outer ring 2 on an inner diameter side of the outer ring 2. The inner ring 3 has an inner ring raceway 8 having an arc-shaped cross section in an outer circumferential surface in an axially central portion over the entire circumference and has seal grooves 9 which are concave inward in the radial direction in outer circumferential surfaces of axial both side portions over the entire circumference. Furthermore, the inner ring 3 has ring-shaped sliding surfaces 10 on side surfaces of inner surfaces of the seal grooves 9 facing in opposite directions (outward in an axial direction) over the entire circumference. In this example, each of the sliding surfaces 10 has a plurality of micro-groove-shaped machining marks 30 (refer to part (a) and part (b) of FIG. 5A and part (a) and part (b) of FIG. 5B) having a depth of about 0 µm to 2 µm formed in irregular directions.

With regard to the rolling bearing 1, the expression "inside in the axial direction" refers to a "center side in a width direction" of the rolling bearing 1 and the expression "outside in the axial direction" refers to the outside (both sides) in the width direction of the rolling bearing 1.

Each of the rolling elements 4 is made of an iron-based alloy such as bearing steel or ceramics and disposed to freely roll in a state being held between the outer ring raceway 6 and the inner ring raceway 8 using a holding tool 11. In this example, balls are used as the rolling elements 4.

Sealing devices 5 close opening portions on both sides in the axial direction of the internal space 12 having the rolling elements 4 disposed therein, thereby preventing grease sealed in the internal space 12 from leaking to the outside as well as preventing foreign substances such as rainwater, mud, and dust from entering the internal space 12. Each of the sealing devices 5 includes an annular core 13 and an elastic member 14 made of an elastomer or the like such as rubber reinforced by the core 13. Each of the sealing devices 5 can be produced by disposing the core 13 in a cavity of a mold and then mold-forming a material constituting the elastic member 14 into the core 13. Examples of the material constituting the elastic member 14 include nitrile rubber, acrylic rubber, silicone rubber, fluorine rubber, ethylene propylene-based rubber, hydrogenated nitrile rubber, and the like.

The core 13 has a substantially L-shaped cross-sectional shape by bending a metal plate such as a mild steel plate and is formed in an annular shape as a whole. That is to say, the core 13 includes a cylindrical section 15 and a circular ring section 16 bent at a right angle inward in the radial direction from an end portion of the cylindrical section 15 on an outer side in the axial direction.

The elastic member 14 includes an elastic locking section 17 present at an end portion thereof on an outer side in the radial direction, a thin-walled ring covering section 18 configured to cover an outer surface of the circular ring section 16 in the axial direction over the entire circumference, and a seal section 19 present at a radially inner end portion.

The elastic locking section 17 has a width dimension slightly larger than a width dimension (an axial dimension) of each of the locking concave grooves 7 in a free state before the elastic locking section 17 is locked in the locking concave groove 7 of the outer ring 2 and covers an outer circumferential surface and a distal end surface (an axially inner end surface) of the cylindrical section 15 in the core 13.

The seal section 19 includes a seal lip 20, a grease lip 21, and a dust lip 22.

The seal lip 20 is formed to further protrude inward in the radial direction and outward in the axial direction than a radially inner end portion of the circular ring section 16 in the core 13 and has the distal end portion being in sliding contact with the sliding surface 10 of each of the seal grooves 9 over the whole circumference.

The grease lip 21 has a substantially triangular cross-sectional shape and is formed to protrude inward in the axial direction from a portion of the seal section 19 located further outward in the radial direction than the seal lip 20. The grease lip 21 has a distal end portion close to and facing a connection portion of an outer circumferential surface of the inner ring 3 between the inner ring raceway 8 and the seal grooves 9 so that a labyrinth seal is formed between the corresponding portion and the distal end portion of the grease lip 21.

The dust lip 22 has a substantially rectangular cross-sectional shape and is formed to extend inward in the radial direction from the radially inner end portion of the ring covering section 18. The dust lip 22 has a distal end portion close to and facing a portion of the inner ring 3 present further outward in the axial direction than the seal groove 9 so that a labyrinth seal is formed between the corresponding portion and the distal end portion of the dust lip 22.

Each of the sealing devices 5 is supported with respect to the outer ring 2 by disposing (locking) the elastic locking section 17 inside the locking concave groove 7 in a state in which the elastic locking section 17 is elastically compressed in the axial direction and the radial direction and a distal end portion of the seal lip 20 is in sliding contact with the sliding surface 10 of the seal groove 9 over the entire circumference with a closing allowance.

When the inner ring 3 constituting the rolling bearing 1 is produced, first, an outer shape of the inner ring 3 is formed by subjecting a metal material to plastic working such as forging or cutting.

Figure 2:
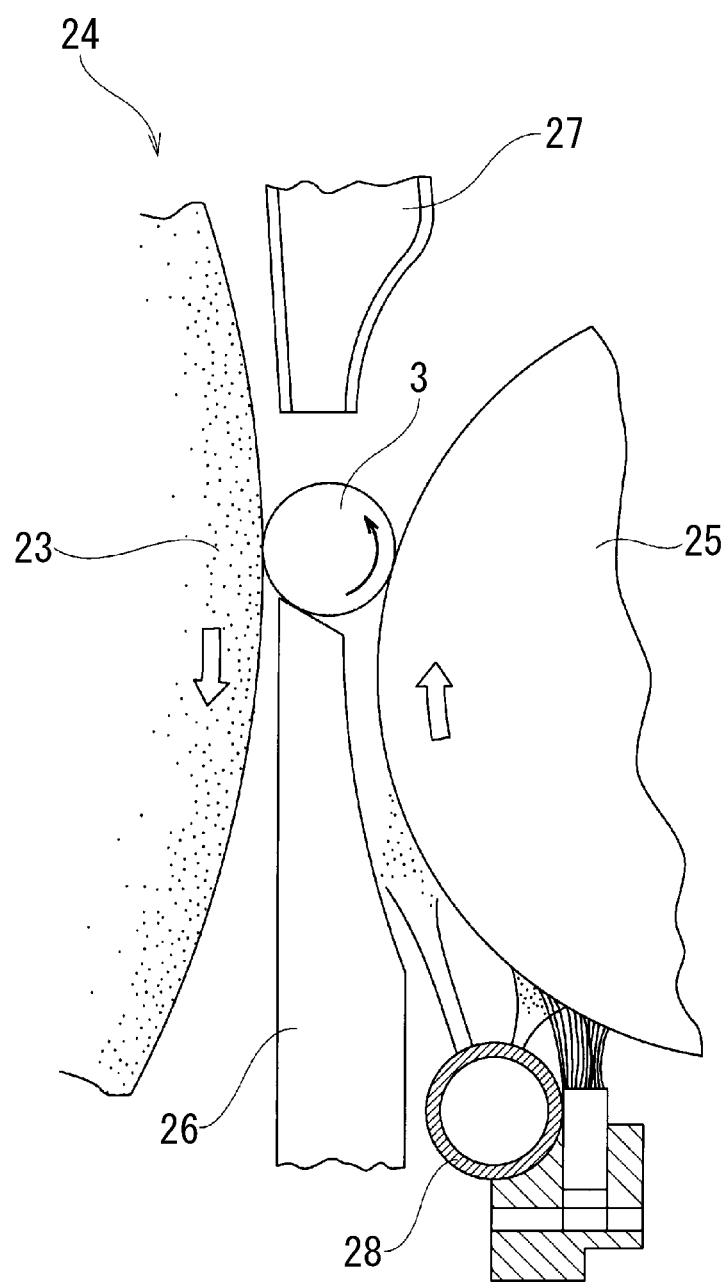
FIG. 2 is a side view showing a state in which a centerless grinding step is performed in the first example of the embodiment of the present invention.

In the centerless grinding step subsequent to the step, the outer circumferential surface of the inner ring 3 is subjected to grinding by pressing a grindstone 23 against a portion of an outer circumferential surface of the inner ring 3 including the sliding surface 10 while rotating the inner ring 3 in one direction. In the centerless grinding step, for example, a grinding machine 24 as shown in FIG. 2 can be used. The grinding machine 24 includes the grindstone 23, an adjustment wheel 25, a work rest 26, and a grinding fluid nozzle 27.

The grindstone 23 is a rotating grindstone which has a disk shape, has a generatrix shape along a generatrix shape of the outer circumferential surface of the inner ring 3, and rotates about a central axis (not shown). As the grindstone 23, for example, a grindstone obtained by bonding A (alumina)-based abrasive grains using a glass-based bond and having bond particle sizes of #60 to #400, a degree of bond of G to O, and a degree of concentration of 4 to 12 can be used.

The adjustment wheel 25 is rotatably driven about the central axis of the grindstone 23 inclined by a predetermined angle with respect to the central axis. The grinding machine 24 shown in the drawings further includes a cleaning device 28 configured to remove foreign substances such as grinding chips adhered to an outer circumferential surface of the adjustment wheel 25 during grinding.

The work rest 26 is disposed below a portion between the grindstone 23 and the adjustment wheel 25 and supports the inner ring 3 from below.

The grinding fluid nozzle 27 is disposed above the portion between the grindstone 23 and the adjustment wheel 25 so that a discharge port for a grinding fluid is directed downward.

When the centerless grinding step is performed using the grinding machine 24, first, the inner ring 3 which is a workpiece is placed between an upper surface of the work rest 26 and the outer circumferential surface of the adjustment wheel 25. Subsequently, the grinding fluid is discharged toward the outer circumferential surface of the inner ring 3 through the grinding fluid nozzle 27. Furthermore, by rotatably driving the adjustment wheel 25, the corresponding portion of the outer circumferential surface of the inner ring 3 including the sliding surface 10 is subjected to grinding by pressing the grindstone 23 rotating about the central axis thereof against the corresponding portion while rotating the inner ring 3 in one direction (counterclockwise in the shown example against the portion). In this case, by making a peripheral speed of the inner ring 3 and a peripheral speed of the grindstone 23 different from each other, the inner ring 3 is rotated relative to the grindstone 23 in a predetermined direction (one direction).

In this way, in the centerless grinding step, grinding is performed by pressing the hard grindstone 23 against the outer circumferential surface of the inner ring 3 while rotating the inner ring 3 relative to the grindstone 23 in a predetermined direction. For this reason, deformation such as bumps and burrs is likely to occur on both sides of a grinding streak 29 of the sliding surface 10 of the inner ring 3 obtained through the centerless grinding step formed to extend in a circumferential direction (a leftward/rightward direction in part (a) of FIG. 5A and part (a) of FIG. 5B) by passing abrasive grains in the grindstone 23 through the sliding surface 10.

In the finishing step subsequent to the step, a process of forming a large number of machining marks 30 on the sliding surface 10 in irregular directions is performed.

Figure 3:
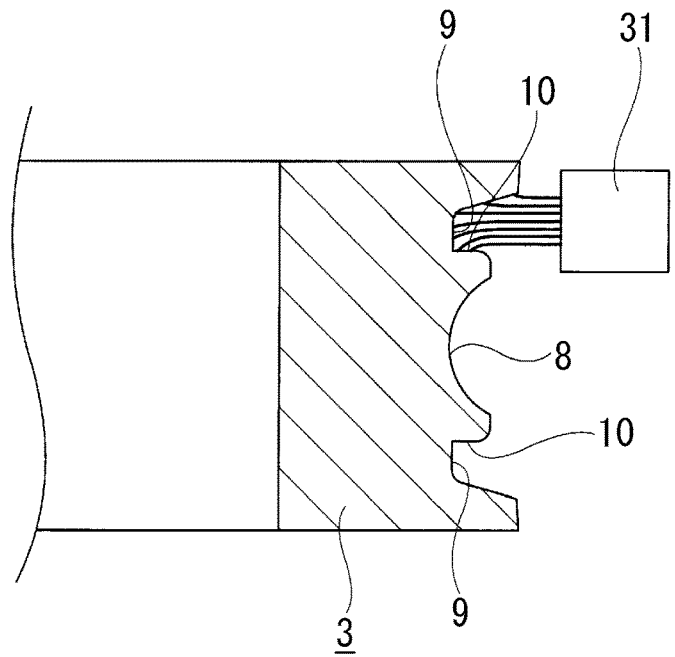
FIG. 3 is a cross-sectional view showing a state in which a finishing step is performed in the first example of the embodiment of the present invention.

For example, as shown in FIG. 3, the finishing step can be performed using a brush with abrasive grains 31. As the brush with abrasive grains 31, for example, a brush obtained by mixing a nylon fiber such as nylon 6 with A (alumina)-based or GC (green silicon carbide)-based abrasive grains having particle sizes of #80 to #600 and made of a wire having moderate elasticity can be used.

When the finishing step is performed using the brush with abrasive grains 31, the inner ring 3 is rotated about the central axis of the inner ring 3 while the brush with abrasive grains 31 is pressed against the seal grooves 9 of the inner ring 3. Since a distal end portion of the brush with abrasive grains 31 is deformed due to the elasticity of fibers constituting the brush with abrasive grains 31 in irregular directions, a place to be pressed changes as the inner ring 3 rotates. For this reason, it is possible to form the plurality of machining marks 30 on the sliding surface 10 in irregular directions as shown in part (a) and part (b) of FIG. 5A and part (a) and part (b) of FIG. 5B by performing polishing on inner surfaces of the seal grooves 9 including the sliding surface 10 using the brush with abrasive grains 31.

The finishing step is not limited to the method using the brush with abrasive grains 31 and is not particularly limited as long as a large number of machining marks 30 in irregular directions are formed on the sliding surface 10. To be specific, for example, it is possible to form a large number of machining marks 30 in irregular directions on the sliding surface 10 by performing polishing on the sliding surface 10 by moving a nonwoven fabric abrasive obtained by adhering A (alumina)-based or GC (green silicon carbide)-based abrasive grains having particle sizes of #80 to #600 to a nylon non-woven fabric along the sliding surface 10.

Irrespective of which of these methods is used in the finishing step, it is possible to process the pair of seal grooves 9 simultaneously or process the pair of seal grooves 9 separately (sequentially).

Also, before, after, or simultaneously with the finishing step, the inner ring 3 is completed by subjecting the inner ring raceway 8 to a super-finishing process for improving a surface roughness of the inner ring raceway 8 or performing heat treatment such as quenching at an appropriate timing as necessary.

Subsequently, when the rolling bearing 1 is constituted by combining the inner ring 3 with the outer ring 2, the rolling elements 4, the pair of sealing devices 5, and the holding tool 11, an inspection is performed to determine whether a sufficient amount of machining marks 30 have been formed on the sliding surface 10 to minimize a difference of a rotation torque of the inner ring 3 with respect to the outer ring 2 in the direction of relative rotation between the outer ring 2 and the inner ring 3 to a predetermined value or less.

Figure 4:
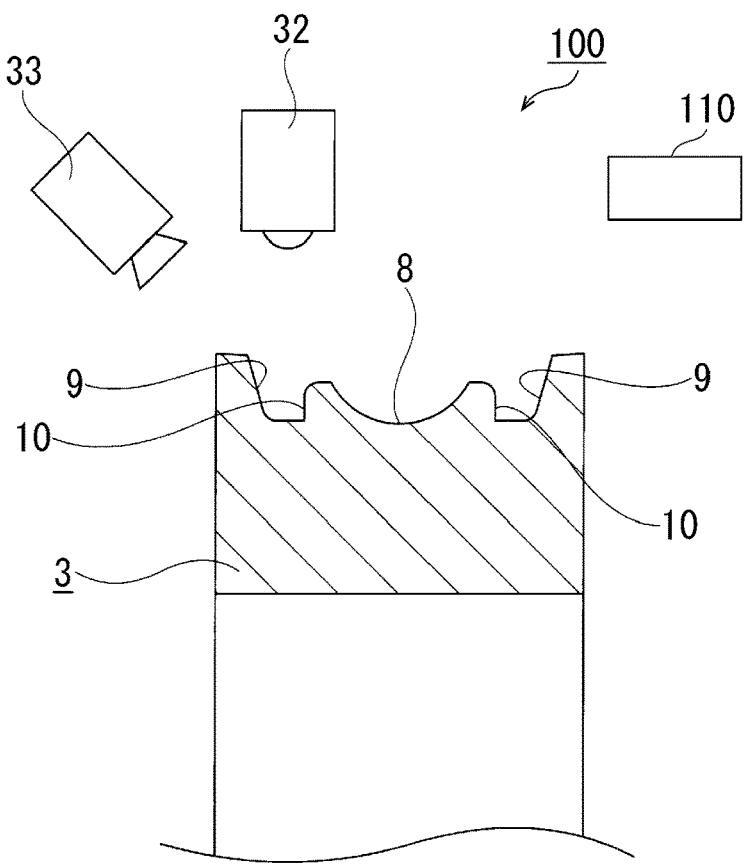
FIG. 4 is a schematic diagram showing a state in which a sliding surface is photographed using a camera in the first example of the embodiment of the present invention.

For this reason, first, as shown in FIG. 4, a photographing step of obtaining an original image by performing photographing using a camera 33 while a light 32 irradiates the sliding surface 10 of the inner ring 3 with light is performed. An inspecting device 100 includes the light 32, the camera 33, a controller 110, and the like.

As a preparation before the camera 33 photographs the sliding surface 10, an irradiation direction of the light 32 is adjusted so that the machining marks 30 formed on the sliding surface 10 in the finishing step are clearly displayed (appear) in a current image. In order to adjust the irradiation direction of the light 32, specifically, for example, an inner ring (a master work) 3 in which an area or/and the number of machining marks 30 formed on the sliding surface 10 are known is prepared and a detection image is obtained by subjecting the original image obtained by photographing the sliding surface 10 of the inner ring (the master work) 3 using the camera 33 to a detecting step which will be described later. Furthermore, it is possible to adjust the irradiation direction of the light 32 by adjusting an attachment position, an attachment angle, or the like of the light 32 so that the area or/and the number of machining marks 30 in the detection image are predetermined values. Once an operation of adjusting a lighting direction of the light 32 is performed, as long as the inner ring 3 having the same shape and dimensions is to be photographed, it is not necessary to perform this process each time. In this example, a blue light configured to emit blue light is used as the light 32. As the blue light, specifically, for example, a blue light including a blue light emitting diode (a blue LED) can be used.

As a preparation before the camera 33 photographs the sliding surface 10, an attachment angle of the camera 33 is adjusted while a monitor or the like checks the output image of the camera 33 so that a circumferential direction of the inner ring 3 coincides with a horizontal direction (a leftward/rightward direction) of an output image of the camera 33. It is desirable that a task of adjusting the attachment angle of the camera 33 be performed for each product. It is desirable that a camera having a telecentric lens be used as the camera 33.

In the photographing step, an original image (a still image) as shown in part (a) of FIG. 5A and part (a) of FIG. 5B is obtained by performing photographing using the camera 33 while the light 32 irradiates the sliding surface 10 of the inner ring 3 with light. When the camera 33 photographs the sliding surface 10, it is also possible to photograph only a part of the sliding surface 10. In addition, it is also possible to photograph the sliding surface 10 over the entire circumference by rotating the inner ring 3 relative to the camera 33 while keeping a shutter of the camera 33 open.

In the detecting step subsequent to the step, a detection image as shown in part (a) of FIG. 5A and part (b) of FIG. 5B is obtained by subjecting the original image to an imaging process of detecting the machining marks 30. To be specific, the detection image is obtained by subjecting the original image to an imaging process of removing the grinding streak 29 formed to extend in the circumferential direction from the original image.

A specific method for the imaging process for obtaining the detection image from the original image is not particularly limited. To be specific, for example, a method for detecting, as the machining marks 30, a portion (a pixel group) in which pixels whose pixel values are within a predetermined range are equal to or more than a predetermined threshold value and are linearly gathered and which is inclined by a predetermined angle with respect to the horizontal direction (the leftward/rightward direction) of the original image can be adopted.

That is to say, first, a white pixel is detected from the original image. A determination concerning whether a pixel is white can be performed on the basis of, for example, whether each of an R value, a G value, and a B value is equal to or more than a predetermined value set in advance through an experiment or the like. Subsequently, a portion (a pixel group) in which the detected white pixels are equal to or more than a predetermined threshold value and are linearly present in a gathered manner is detected. To be specific, for example, in the portion in which the white pixels are equal to or more than a predetermined threshold value and are present in a gathered manner, a pixel group in which a ratio (W/L) of a width dimension W to a length dimension L is equal to or more than a predetermined value determined in advance through an experiment or the like is detected. The portion in which the white pixels are present in a gathered manner is a portion in which an arbitrary white pixel in a gathered white pixels and another white pixel are adjacent to each other in a vertical direction or a horizontal direction. For example, in the example of FIG. 6, eight white pixels are gathered. The predetermined threshold value is appropriately determined depending on the number of pixels of the camera 33, a magnification of the original image, a difference of a rotation torque required for the rolling bearing 1, and the like. To be specific, for example, when the camera 33 having 5 million pixels captures the sliding surface 10 corresponding to a range of about 5 mm$^2$ at a magnification of about 4 times, it is possible to set the predetermined threshold value to 40,000.

Also, a detection image is obtained by performing detecting using, as the machining marks 30, a pixel group of the detected pixel group in which an inclination angle θ of a length direction (an extension direction) of a pixel group with respect to a horizontal direction of the original image coinciding with the circumferential direction of the inner ring 3 (a formation direction of the grinding streak 29) is in the range of 15° or more and 45° or less and removing the remaining portion, that is, converting the remaining portion into blue or black pixels. Here, as the imaging process for obtaining the detection image from the original image, another method known in the related art can be adopted.

After the detection image has been obtained from the original image, in the evaluating step subsequent to the step, when the rolling bearing 1 is constituted of by combining the inner ring 3 with the outer ring 2, the rolling elements 4, the pair of sealing devices 5, and the holding tool 11, an estimation concerning whether a sufficient amount of machining marks 30 is formed on the sliding surface 10 to minimize a difference of a rotation torque of the inner ring 3 with respect to the outer ring 2 in the direction of relative rotation between the outer ring 2 and the inner ring 3 to a predetermined value or less is performed on the basis of the detection image. To be specific, an evaluation concerning whether a sufficient amount of machining marks 30 is formed is performed on the basis of the total area or/and the number of machining marks 30 in the detection image. For this reason, a relationship between the total area or/and the number of machining marks 30 and the difference of the rotation torque of the inner ring 3 with respect to the outer ring 2 in the direction of relative rotation between the outer ring 2 and the inner ring 3 is obtained in advance through experiments and is recorded as a map or a calculation expression. In the evaluating step, the total area or/and the number of machining marks 30 in the detection image is calculated and the difference of the rotation torque of the inner ring 3 with respect to the outer ring 2 in the direction of relative rotation between the outer ring 2 and the inner ring 3 is obtained on the basis of the above relationship. The total area of the machining marks 30 can be calculated on the basis of the total number of white pixels in the detection image. Furthermore, the number of machining marks 30 can be calculated on the basis of the number of white pixel groups in the detection image.

When the difference of the rotation torque of the inner ring 3 with respect to the outer ring 2 in the direction of relative rotation between the outer ring 2 and the inner ring 3 is equal to or less than a predetermined value, that is, a sufficient amount of machining marks 30 is formed, the inner ring 3 is sent to the assembling step subsequent to the step. In the assembling step, the rolling bearing 1 is obtained by assembling the inner ring 3 with the outer ring 2, the rolling elements 4, the pair of sealing devices 5, and the holding tool 11. For example, methods known in the related art can be applied for a method for producing the outer ring 2, the rolling elements 4, the pair of sealing devices 5, and the holding tool 11 and a method for assembling the rolling bearing 1.

When the difference of the rotation torque of the inner ring 3 with respect to the outer ring 2 in the direction of relative rotation between the outer ring 2 and the inner ring 3 is larger than a predetermined value, that is, a sufficient amount of machining marks 30 is not formed, the finishing step is performed again.

In this example, the controller 110 causes the camera 33 to photograph at least a part of the sliding surface 10 to obtain an original image, causes the imaging process to be performed on the original image and to detect a plurality of machining marks in the sliding surface 10, and causes rotation characteristics of a component having the raceway ring member assembled therein to be estimated on the basis of the detection results of the machining marks. According to this example, before the rolling bearing 1 is assembled, it is possible to estimate whether the difference of the rotation torque of the inner ring 3 with respect to the outer ring 2 in the direction of relative rotation between the outer ring 2 and the inner ring 3 (a difference of a rotation torque between forward rotation and reverse rotation) is equal to or less than a predetermined value. For this reason, after the rolling bearing has been assembled, when a difference of a rotation torque of the inner ring with respect to the outer ring in the direction of relative rotation between the outer ring and the inner ring is not equal to or less than a predetermined value, there is no need to disassemble the rolling bearing and it is possible to reduce the producing costs of the rolling bearing 1.

Since the blue light is used as the light 32 in this example, when the camera 33 photographs the sliding surface 10, it is possible to clearly float the machining marks 30. For this reason, it is possible to improve the estimation accuracy of the difference of the rotation torque of the inner ring 3 with respect to the outer ring 2 in the direction of relative rotation between the outer ring 2 and the inner ring 3.

Although the inner ring 3 of the rolling bearing (the ball bearing) 1 in which a ball is used as the rolling element 4 is used as a target in this example, in the inspecting method of the present invention, a needle bearing, a cylindrical bearing, and a raceway ring member of a tapered roller bearing can also be used as targets. Furthermore, the present invention is not limited to a single-row rolling bearing. In addition, a raceway ring member of a multi-row rolling bearing including a double row can also be used as a target of the present invention and an outer ring including a sliding surface in sliding contact with the distal end portion of the seal lip constituting the sealing device over the entire circumference can also be used as a target of the present invention. Furthermore, the present invention is not limited to a raceway ring member of a radial rolling bearing. In addition, if the sealing device is provided, a raceway ring member of a thrust rolling bearing can also be used as a target of the present invention.

Also, the imaging process performed in the detecting step is not limited to the above-described method as long as it can detect the machining marks 30. To be specific, for example, it is possible to obtain a detection image by photographing the sliding surface 10 of the inner ring 3 after the centerless grinding step and before the finishing step in advance using the camera 33 and comparing the images before and after the finishing step (obtaining a difference).

Also, before performing the detecting step, it is also possible to perform an imaging process for the grinding streak 29 or/and noise. To be specific, for example, it is possible to perform a filter process or the like on the original image using a low-pass filter or a smoothing filter.

When a distance between the central axis of the inner ring 3 and the central axis of the grindstone 23 which is a rotating grindstone changes in the centerless grinding step, the grinding streak 29 formed through the abrasive grains in the grindstone 23 passing through the sliding surface 10 is likely to be formed to extend in a direction in which the grinding streak 29 is inclined with respect to the circumferential direction of the inner ring 3. In this case, when the camera 33 photographs the sliding surface 10, it is possible to adjust the attachment angle of the camera 33 so that the formation direction (the extension direction) of the grinding streak 29 coincides with the horizontal direction (the leftward/rightward direction) or a vertical direction (an upward/downward direction) of the output image of the camera 33.

Second Example of Embodiment

A second example of the embodiment of the present invention will be described with reference to FIGS. 7 to 10. In this example, a hub main body constituting a hub of a hub unit bearing which rotatably supports a wheel and a rotating body for braking with respect to a suspension system of the vehicle is used as a target. As shown in FIG. 7, a hub unit bearing 34 rotatably supports a hub 36 which is an inner diameter side raceway ring member and a rotation side raceway ring member inside an outer ring 35 which is an outer diameter side raceway ring member and a fixed side raceway ring member via the plurality of rolling elements 37a and 37b.

The outer ring 35 is made of a hard metal such as medium carbon steel and includes double rows of outer ring raceways 38a and 38b and a stationary flange 39. The double rows of outer ring raceways 38a and 38b are formed on an inner circumferential surface of an axially intermediate portion of the outer ring 35 over the entire circumference. The stationary flange 39 is formed to protrude outward in the radial direction at the axially intermediate portion of the outer ring 35 and has a plurality of support holes 40 which are screw holes at a radially intermediate portion thereof in the circumferential direction. The outer ring 35 is supported and fixed to a knuckle 41 by screwing and tightening bolts 43 inserted through through holes 42 formed in the knuckle 41 constituting the suspension system of the vehicle into the support holes 40 of the stationary flange 39 from the inside in the axial direction.

With regard to the hub unit bearing 34, the expression "inside in the axial direction" refers to the right side in FIGS. 7 and 8 which is on a center side of a vehicle body in a state in which the hub unit bearing 34 is assembled to an automobile. On the other hand, the expression "outside in the axial direction" refers to the left side in FIGS. 7 and 8 which is outside the vehicle body in a state in which the hub unit bearing 34 is assembled to the automobile.

The hub 36 is disposed coaxially with the outer ring 35 on an inner diameter side of the outer ring 35 and includes double rows of inner ring raceways 44a and 44b and a rotating flange 45. The double rows of inner ring raceways 44a and 44b are formed on a portion of an outer circumferential surface of the hub 36 facing the double rows of outer ring raceways 38a and 38b over the entire circumference. The rotating flange 45 is formed to protrude outward in the radial direction at a portion of the hub 36 positioned at further axially outer side than an axially outer end portion of the outer ring 35 and has a plurality of attachment holes 46 which are open in the axial direction at the radially intermediate portion in the circumferential direction. In this example, in order to join and fix the rotating body for braking 47 such as a disk or a drum to the rotating flange 45, serration portions formed at portions near base ends of studs 48 are pressed-fitted into the attachment holes 46 and intermediate portions of the studs 48 are pressed-fitted into the through holes 49 is formed in the rotating body for braking. Furthermore, in order to fix a wheel 50 constituting the wheel to the rotating flange 45, nuts 52 are screwed into the male screw portions and tightened in a state in which male screw portions formed at the distal end portions of the studs 48 are inserted into the through holes 51 formed in the wheel 50. Since the hub unit bearing 34 in this example is for a driving wheel, an engaging hole 64 configured to engage a drive shaft (not shown) is provided at a center portion of the hub 36.

In this example, the hub 36 is constituted by joining and fixing a hub main body 53 made of a hard metal such as medium carbon steel and having the inner ring raceway 44a on an outer side in the axial direction to an inner ring 54 made of a hard metal such as bearing steel and having the inner ring raceway 44b on an inner side in the axial direction. To be specific, the hub main body 53 is joined and fixed to the inner ring 54 by pressing an axially inner end surface of the inner ring 54 using a swaged section 56 obtained by elastically deforming an axially inner end portion of the cylindrical section 55 present at an axially inner end portion of the hub main body 53 outward in the radial direction in a state in which the inner ring 54 is externally fitted to an axially inner portion of the hub main body 53. The hub 36 in this example has a sliding surface 57 over the entire circumference in a range from a radially inner end portion of an axially inner surface of the rotating flange 45 to a portion of an outer circumferential surface present further outward in the axial direction than the inner ring raceway 44a outward in the axial direction. The plurality of micro-groove-shaped machining marks 30 (refer to part (a) and part (b) of FIG. 5A and part (a) and part (b) of FIG. 5B) are formed on the sliding surface 57 in irregular directions.

Rolling elements 37a and 37b are each made of a hard metal such as bearing steel or ceramics and are arranged to freely roll in a state in which a respective plurality of the rolling elements 37a and 37b are held by holding tools 58a and 58b between the double rows of outer ring raceways 38a and 38b and the double rows of inner ring raceways 44a and 44b. With such a constitution, the hub 36 is rotatably supported on the inner diameter side of the outer ring 35. In this example, balls are used as the rolling elements 37a and 37b.

Also, in the hub unit bearing 34 in this example, an axially inner opening portion of an internal space 59 having the rolling elements 37a and 37b disposed therein is closed using a combination seal ring 60 and an axially outer opening portion of the internal space 59 is closed using a sealing device 61. Thus, the grease sealed in the internal space 59 is prevented from leaking to the outside and foreign substances such as rainwater, mud, and dust are prevented from entering the internal space 59.

The combination seal ring 60 is constituted by bringing distal end portions of a plurality of seal lips constituting a seal ring 63 internally fitted and fixed to an axially inner end portion of the outer ring 35 into sliding contact with a slinger 62 externally fitted to an axially inner end portion of the hub 36.

The sealing device 61 includes an annular core 65 and an elastic member 66 made of an elastomer or the like such as rubber reinforced through the core 65.

The core 65 has a substantially L-shaped cross-sectional shape by bending a metal plate such as a mild steel plate and is formed in an annular shape as a whole. That is to say, the core 65 is in a cylindrical shape and includes a fitting cylindrical section 67 which is internally fitted and fixed to an axially outer end portion of the outer ring 35 and a bent portion 68 bent inward in the radial direction from an axially outer end portion of the fitting cylindrical section 67.

The elastic member 66 includes a base portion 69 and a plurality of (three in the shown example) seal lips 70. The base portion 69 is fixed to the corresponding portion through vulcanization bonding to cover an axially outer surface and a radially inner end portion of the bent portion 68 of the core 65. Each of the seal lips 70 extends from the base portion 69 toward the sliding surface 57 of the hub 36 and has a distal end portion in sliding contact with the sliding surface 57 over the entire circumference.

When the hub main body 53 constituting the hub 36 of the hub unit bearing 34 is produced, first, an outer shape of the hub main body 53 is formed by subjecting a metal material to forging, cutting, or the like.

In the centerless grinding step subsequent to the step, as shown in FIG. 9, grinding is performed on the outer circumferential surface of the hub main body 53 by pressing the grindstone 71 against a portion of the outer circumferential surface of the hub main body 53 including the sliding surface 57 while rotating the hub main body 53 relative to a grindstone 71 in a predetermined direction.

The grindstone 71 in this example is a so-called formed-type rotating grindstone having a generatrix shape in a generatrix shape of the outer circumferential surface of the hub main body 53 in a range from the sliding surface 57 toward an axially inner end portion of the cylindrical section 55. As the grindstone 71, for example, a grindstone obtained by joining A (alumina)-based abrasive grains through a glass-based bond and having bond particle sizes of #60 to #400, a degree of bond of G to O, and a degree of concentration of 4 to 12 can be used.

When the centerless grinding step is performed using the grindstone 71, first, the hub main body 53 is rotated by joining a magnet chuck 72 to an axially outer surface of the rotating flange 45 through magnetic attraction and rotating the magnet chuck 72. Furthermore, the hub main body 53 is positioned in a radial direction by supporting an outer circumferential surface of an axially intermediate portion of the hub main body 53 by a pair of (only one thereof is shown in FIG. 9) shoes 73. Furthermore, grinding is performed on the corresponding portion by pressing an outer circumferential surface of the grindstone 71 against a portion of the outer circumferential surface of the hub main body 53 including the sliding surface 57 while rotating the grindstone 71 which is a formed-type rotating grindstone about its central axis $O_{71}$. The grindstone 71 has a generatrix shape appropriately adjusted to a shape along a generatrix shape of the hub main body 53 which has been subjected to the centerless grinding step using a formed-type rotary dresser 74. Furthermore, deformation such as bumps and burrs is likely to occur on both sides of the grinding streak 29 (refer to part (a) of FIG. 5A and part (b) of FIG. 5B) of the sliding surface 57 of the hub main body 53 obtained through the centerless grinding step formed by the abrasive grains in the grindstone 71 passing therethrough.

In the finishing step subsequent to the step, a process of forming a larger number of machining marks 30 on the sliding surface 57 in irregular directions is performed. To be specific, for example, it is possible form a large number of machining marks 30 on the sliding surface 57 in irregular directions by performing polishing the sliding surface 57 using the brush with the abrasive grains 31 (refer to FIG. 3) and a nonwoven fabric abrasive.

Also, the hub main body 53 is completed by performing the super-finishing process on the inner ring raceway 44a on an outer side in the axial direction before, after, or simultaneously with the finishing step or performing heat treatment such as quenching at an appropriate timing as necessary.

Subsequently, when the hub unit bearing 34 is constituted by combining the hub main body 53 with the outer ring 35, the rolling elements 37a and 37b, the holding tools 58a and 58b, the inner ring 54, the combination seal ring 60, and the sealing device 61, an inspection concerning whether a sufficient amount of machining marks 30 is formed on the sliding surface 57 to minimize the difference of the rotation torque of the hub 36 in a rotational direction of the hub 36 to a predetermined value or less is performed.

First, as shown in FIG. 10, the photographing step of obtaining the original image by performing photographing using the camera 33a while the light 32a irradiates the sliding surface 57 of the hub main body 53 with light is performed.

As a preparation before the camera 33a photographs the sliding surface 57, an irradiation direction of the light 32a is adjusted so that the machining marks 30 are clearly displayed in the original image and an attachment angle of the camera 33a is adjusted so that the circumferential direction (the formation direction of the grinding streak 29) of the inner ring 3 coincides with a horizontal direction of an output image of the camera 33a. Also in this example, as in the first example of the embodiment, a blue light configured to emit blue light is used as the light 32a and a light having a telecentric lens is used as the camera 33a.

In the photographing step, the camera 33a performs photographing while the light 32a irradiates the sliding surface 57 of the hub main body 53 with light to obtain the original image as shown in part (a) of FIG. 5A and part (a) of FIG. 5B described above, and then the process proceeds to the detecting step subsequent to the step. In the detecting step, the original image is subjected to the imaging process of detecting the machining marks 30 to obtain the detection image as shown in part (b) of FIG. 5A and part (b) of FIG. 5B described above.

Subsequently, in the evaluating step, when the hub unit bearing 34 is constituted by combining the hub main body 53 with the outer ring 35, the rolling elements 37a and 37b, the holding tools 58a and 58b, the inner ring 54, the combination seal ring 60, and the sealing device 61, an estimation concerning whether a sufficient amount of machining marks 30 is formed on the sliding surface 57 to minimize the difference of the rotation torque of the hub 36 in the rotational direction of the hub 36 to a predetermined value or less is performed on the basis of the detection image. For this reason, a relationship between the total area or/and the number of machining marks 30 and the difference of the rotation torque of the hub 36 in the rotational direction of the hub 36 is obtained in advance through experiments and recorded as a map, a calculation expression, and the like. In the evaluating step, the total area or/and the number of machining marks 30 in the detection image are calculated and the difference of the rotation torque of the hub 36 in the rotational direction of the hub 36 is obtained on the basis of the above relationship.

When it is estimated that the difference of the rotation torque of the hub 36 in the rotational direction of the hub 36 is equal to or less than the predetermined value, the hub main body 53 is sent to the assembling step subsequent to the step. In the assembling step, the hub unit bearing 34 is obtained by combining the hub main body 53 with the outer ring 35, the rolling elements 37a and 37b, the holding tools 58a and 58b, the inner ring 54, the combination seal ring 60, and the sealing device 61. For example, as the method for producing the outer ring 35, the rolling elements 37a and 37b, the holding tools 58a and 58b, the inner ring 54, the combination seal ring 60, and the sealing device 61 and the method for assembling the hub unit bearing 34, conventionally known methods can be applied.

On the other hand, when an estimation concerning whether the difference of the rotation torque of the hub 36 is larger than a predetermined value in the rotational direction of the hub 36 is performed, the finishing step of forming the machining marks 30 is performed on the hub main body 53 again.

In this example, the controller 110a causes the camera 33a to photograph at least a part of the sliding surface 57 to obtain an original image, causes the original image to be subjected the imaging process and to detect a plurality of machining marks of the sliding surface 57, and causes the rotation characteristics of a component having the raceway ring member assembled therein to be estimated on the basis of the detection result of the machining marks. According to this example, before the hub unit bearing 34 is assembled, an estimation on whether the difference of the rotation torque of the hub 36 in the rotational direction of the hub 36 is equal to or less than a predetermined value can be performed. For this reason, after the hub unit bearing has been assembled, when it is not estimated that the difference of the rotation torque of the hub is equal to or less than the predetermined value in the rotational direction of the hub, there is no need to disassemble the hub unit bearing and it is possible to reduce the producing costs of the hub unit bearing 34.

As in this example, if the centerless grinding step is performed using the grindstone 71 which is a formed-type rotating grindstone and the magnet chuck 72, a logarithmic-spiral-shaped (a spiral-shaped) grinding streak is likely to be formed on the obtained sliding surface 57 of the hub main body 53. That is to say, when the hub main body 53 is positioned in the radial direction using a pair of shoes 73, a pressing force in a direction directed to a portion between the pair of shoes 73 is applied to the hub main body 53 by bringing a central axis $O_{53}$ of the hub main body 53 to be eccentric to a rotation central axis $O_{72}$ of the magnet chuck 72. Therefore, a core height (a height in the upward/downward direction) of the central axis $O_{53}$ of the hub main body 53 easily does not coincide with a core height of the central axis $O_{71}$ of the grindstone 71 due to the friction occurring at the distal end portions of the pair of shoes 73 due to a friction acting between the outer circumferential surface of the hub main body 53 and the distal end portions of the pair of shoes 73. For this reason, a grinding position with respect to the sliding surface 57 (particularly, a portion facing inward in the axial direction thereof) using the grindstone 71 changes in the upward/downward direction and the grinding streak 29 formed on the sliding surface 57 using the abrasive grains in the grindstone 71 passing through the sliding surface 57 is likely to be formed in a logarithmic spiral shape. In this case, when the camera 33a photographs the sliding surface 57, it is possible to adjust the attachment angle of the camera 33a so that the formation direction (the extension direction) of the grinding streak 29 coincides with the horizontal direction (the leftward/rightward direction) or the vertical direction (the upward/downward direction) of the output image of the camera 33a. The constitution and the action and effect of the other parts are the same as those of the first example of the embodiment.

Although the hub main body constituting the hub 36 of the hub unit bearing 34 in which the balls are used as the rolling elements 37a and 37b is used as a target in the inspecting method in this example, in the inspecting method of the present invention, the raceway ring member of the hub unit bearing in which a tapered roller is used as a rolling element can also be used as a target. Furthermore, the inspecting method of the present invention is not limited to the raceway ring member of the hub unit bearing for the driving wheel having the engaging hole configured to engage the drive shaft with the center portion of the hub and the raceway ring member of the hub unit bearing for a driven wheel having a solid hub can also be used as a target. Furthermore, the inspecting method of the present invention is not limited to the raceway ring member of the inner ring rotation type hub unit bearing. In addition, if the sealing device is provided, the raceway ring member of the outer ring rotation type hub unit bearing in which the outer diameter side raceway ring member is set as the rotation side raceway ring member and the inner diameter side raceway ring member is set as the fixed side raceway ring member can also be used as a target.

FIG. 11 is a partial schematic diagram of a vehicle 200 including a hub unit bearing (a bearing unit) 151. The present invention can be applied to both a hub unit bearing for a driving wheel and a hub unit bearing for a driven wheel. In FIG. 11, the hub unit bearing 151 is for a driving wheel and includes an outer ring 152, a hub 153, and a plurality of rolling elements 156. The outer ring 152 is fixed to the knuckle 201 of the suspension system using bolts or the like. A wheel (and a rotating body for braking) 202 is fixed to a flange (a rotating flange) 153A provided in a hub 153 using bolts or the like. Furthermore, the vehicle 200 can have the same support structure as described above for the hub unit bearing 151 for the driven wheel.

REFERENCE SIGNS LIST

1 Rolling bearing
2 Outer ring
3 Inner ring
4 Rolling element
5 Sealing device
6 Outer ring raceway
7 Locking concave groove
8 Inner ring raceway
9 Seal groove
10 Sliding surface
11 Holding tool
12 Internal space
13 Core
14 Elastic member
15 Cylindrical section
16 Circular ring section
17 Elastic locking section
18 Ring covering section
19 Seal section
20 Seal lip
21 Grease lip
22 Dust lip
23 Grindstone
24 Grinding machine
25 Adjustment wheel
26 Work rest
27 Grinding fluid nozzle
28 Cleaning device
29 Grinding streak
30 Machining mark
31 Brush with abrasive grain
32, 32a Light
33, 33a Camera
34 Hub unit bearing
35 Outer ring
36 Hub
37a, 37b Rolling element
38a, 38b Outer ring raceway
39 Stationary flange
40 Support hole
41 Knuckle
42 Through hole
43 Bolt
44a, 44b Inner ring raceway
45 Rotating flange
46 Attachment hole
47 Rotating body for braking
48 Stud
49 Through hole
50 Wheel
51 Through hole
52 Nut
53 Hub main body
54 Inner ring
55 Cylindrical section
56 Swaged section
57 Sliding surface
58a, 58b Holding tool
59 Internal space
60 Combination seal ring
61 Sealing device
62 Slinger
63 Seal ring
64 Engaging hole
65 Core
66 Elastic member
67 Fitting cylindrical section
68 Bent portion
69 Base portion
70 Seal lip
71 Grindstone
72 Magnet chuck
73 Shoes
74 Rotary dresser
100 Inspecting device

The invention claimed is:

1. An inspecting method of a raceway ring member which includes a sliding surface with which a distal end portion of a seal lip is in sliding contact, the inspecting method comprising:

obtaining an original image by photographing at least a part of the sliding surface using a camera;

performing an imaging process on the original image and detecting a plurality of machining marks of the sliding surface to obtain a detection image; and estimating rotation characteristics of a component having the raceway ring member assembled therein on the basis of the detection result of the machining marks by estimating a difference of a rotation torque of the raceway ring member with respect to another raceway ring member in a direction of relative rotation between the raceway ring member and the other raceway ring member when the raceway ring member is combined with the other raceway ring member on the basis of an area and/or the number of machining marks in the detection image.

2. The inspecting method of a raceway ring member according to claim 1, wherein the imaging process includes detecting only the machining marks in a predetermined inclination angle range with respect to a grinding streak present on the sliding surface.

3. The inspecting method of a raceway ring member according to claim 1, wherein the imaging process includes detecting a portion in which a predetermined number or more of pixels which have a predetermined color are gathered and are present as the machining marks.

4. The inspecting method of a raceway ring member according to claim 1, wherein a lens of the camera is a telecentric lens.

5. The inspecting method of a raceway ring member according to claim 1, wherein a blue light source is used when the camera photographs the sliding surface.

6. A method for producing a rolling bearing, comprising:
inspecting a plurality of raceway ring members using the method according to claim 1;
assembling a rolling bearing using the inspected raceway ring members.

7. A method for producing a hub unit bearing, comprising:
inspecting a plurality of raceway ring members using the method according to claim 1; and
assembling a hub unit bearing using the inspected raceway ring members.

8. A method for producing a vehicle, comprising:
producing the vehicle using the hub unit bearing produced through the producing method according to claim 7.

9. An inspecting device of a raceway ring member, comprising:
a camera; and
a controller,
wherein the controller is configured to perform:
obtaining an original image by photographing at least a part of a sliding surface with which a distal end portion of a seal lip in the raceway ring member is in sliding contact using the camera;
performing an imaging process on the original image and detecting a plurality of machining marks on the sliding surface to obtain a detection image; and
estimating rotation characteristics of a component having the raceway ring member assembled therein on the basis of the detection result of the machining marks by estimating a difference of a rotation torque of the raceway ring member with respect to another raceway ring member in a direction of relative rotation between the raceway ring member and the other raceway ring member when the raceway ring member is combined with the other raceway ring member on the basis of an area and/or the number of machining marks in the detection image.

* * * * *